(12) United States Patent
Cabello-Fuentes

(10) Patent No.: US 7,175,683 B2
(45) Date of Patent: Feb. 13, 2007

(54) PROCESS FOR TRANSFORMING SLUDGE INTO NPK TYPE GRANULATED FERTILIZER

(75) Inventor: José Cabello-Fuentes, Tamaulipas (MX)

(73) Assignee: Chemical Biosolids, Inc., Edinburg, TX (US)

( * ) Notice: Subject to any disclaimer, the term of this patent is extended or adjusted under 35 U.S.C. 154(b) by 626 days.

(21) Appl. No.: 10/366,057

(22) Filed: Feb. 13, 2003

(65) Prior Publication Data

US 2004/0025553 A1    Feb. 12, 2004

(51) Int. Cl.
    *C05B 11/00*    (2006.01)
(52) U.S. Cl. ............... 71/31; 71/37; 71/42; 71/43; 71/61
(58) Field of Classification Search ............ 71/31, 71/37, 42, 61, 43
    See application file for complete search history.

(56) References Cited

U.S. PATENT DOCUMENTS

| | | | | |
|---|---|---|---|---|
| 3,922,221 A | * | 11/1975 | Rosler et al. ............... 210/710 |
| 4,038,180 A | * | 7/1977 | Talbert ........................ 210/711 |
| 5,385,673 A | * | 1/1995 | Fergen ........................ 210/710 |
| 5,417,861 A | * | 5/1995 | Burnham .................... 210/609 |
| 5,428,906 A | * | 7/1995 | Lynam et al. ................. 34/379 |
| 5,466,273 A | * | 11/1995 | Connell .......................... 71/11 |
| 5,984,992 A | * | 11/1999 | Greer et al. .................... 71/11 |
| 6,398,840 B1 | * | 6/2002 | Orta-Castro et al. ........... 71/12 |

* cited by examiner

*Primary Examiner*—C. Sayala
(74) *Attorney, Agent, or Firm*—Abelman, Frayne & Schwab

(57) ABSTRACT

A process for transforming sludge into npk type granulated fertilizer in which the energy consume is reduced a 90% thanks to the addition of a special filtration step in which the water content is reduced a 50% and the remaining water is evaporated by the exothermic reaction occurring in the process. Additionally, the process of the present invention includes mechanisms that allow some of the by products generated by some of the reactions such as gypsum, to adsorb crystallization water and reduce the humidity of the mass without using external energy.

16 Claims, No Drawings

PROCESS FOR TRANSFORMING SLUDGE INTO NPK TYPE GRANULATED FERTILIZER

BACKGROUND OF THE INVENTION

A. Field of the Invention.

The present invention is related to processes for the treatment of sludge coming from waste water treatment plants, and more particularly to a process in which the sludge produced by waste water treatment plant thickeners containing an average 2% solid content are immediately disinfected using as bioicides: heat and mineral acids which are subsequently neutralized by adding a calcium hydroxide slurry enriched with magnesium.

B. Description of the Related Art.

The disposal of organic waste such as sludge produced by municipal waste water treatment plants on arable lands and aquiferous layers, is subject to strict sanitary regulations, not only due to its high content of pathogen microorganisms and germs which represent a serious health risk, but for its high organic and nutrient content that propitiates disorganized biological growths which consume high amounts of oxygen and causes the death of most living beings existing in the medium in which the organic waste was discharged.

There are several well defined processes for treating sludge produced by waste water treatment plants that accomplishes all ecological rules and governmental regulations. All these processes have a common centrifugation or filtration step before the sterilization step is carried out, which raises the sludge solid content from 2.0% to an average 20%.

The disposal of the sludge is actually carried out using the following processes:

a) Land Fill.

This process consists on confining a filtered sludge having a solid content of 20% in a field having the following characteristics: a low permeability, absence of geological faults, very low volumes of rainfall, and located far away from towns and cities in order to avoid the pollution of auriferous layers with possible leaks of polluted liquid from the land fill. In US it is not allowed to dispose liquid sludge having a solid content of 2.0% without carrying out sterilization with lime or chloride.

Obviously, before the disposal of the sludge in the field, the surface of the field must be sealed with a waterproof and flexible plastic film, and after the deposit of each sludge layer, it has to be applied a very thick soil layer.

Among some of the disadvantages of the above referred process are: its high investment cost, its high operation cost and its null economic profit.

b) Sludge Drying Beds.

Drying beds are the most widely used method of sludge dewatering in the United States. Sludge drying beds are typically used to dewater filtered sludge having a solid content of 20%. After drying, the sludge is removed and either disposed of in a land fill. The most commonly used type of dry bed is the sand drying beds, which are generally used for servicing small and medium-sized communities. In a typical sand drying bed, the sludge must be placed on the bed at a depth no greater than 60 cm in order to guarantee the evaporation of the water. Although the principal advantage of the drying bed is its low cost, it is highly pollutant to the environment and the dry product cannot be used due to its high content of polluting agents such as bacteria and viruses.

c) Compost

This process comprises the steps of mixing a filtered sludge having a solid content of 20% with pasture and exposing the mix to solar heat in order to provoke a biologic decomposition or fermentation of organic matter, by which the temperature of the mass is raised to between about 70 to 75° C., thus destroying pathogen microorganisms and obtaining a product whose use is restricted to improve the quality of soil with organic matter due to its very low content (near 2.5% in dry basis) of major nutrients: nitrogen, phosphorous and potassium. Furthermore, when the compost is added to the soil, it is necessary to add chemical fertilizers in order to avoid affecting the quality of the soil.

This process has the disadvantage of using high volumes of pasture and having high transportation costs derived form transporting and distributing a very humid product and of a very low nutrient content.

d) Pasteurization.

This process comprises the steps of mixing a filtered sludge having a solid content of 20% with pasture; heating the resultant mix with steam and fast cooling the heated mix in order to eliminate all the pathogen microorganisms contained in the sludge and obtain a fertilizer called Compost free of any bacteriological polluting agent.

However, this process is recommended for using in low capacity wastewater treatment plants, in order to apply the produced Compost to arable lands in the proximity of the treatment plant, due to the high transportation costs and low selling price of the Compost, which make unprofitable the transportation of the Compost to places very far away from the plant.

c) Rotary Dryers or Fluidizing Bed Drying.

These processes palletize and reduce the water content of the sludge from 80 to less of 5% by using large amounts of external energy and using high priced fuels such as natural gas or fuel oil.

These processes have the advantage of offering the farmer a dry and non perishable product having a low water content and thus low transportation costs.

However, these processes have the disadvantage of increasing the production costs due to the high consume of energy, because if for each 1b of dry sludge, there are consumed 8,000 BTU, then, for example, if the process starts with a filtered sludge having a solid content of 20%, then 4 tons of water must be evaporated for producing 1 ton of dry sludge, which consume 445 liters of fuel oil, equal to 500 m³ of natural gas.

It is important to note that if the price of natural gas is $4.00 USD/MBTU, then 1 ton of dry sludge would cost $71.68 USD including only the primary energy expenses, and if the costs of other elements are included such as electricity, work force, materials, maintenance parts and other direct and indirect costs, the total product cost would be as much as $126.50 USD/ton, which is higher than the price of a chemical fertilizer such as ammonium sulfate, priced at $85.00 USD/ton granulated and having a nitrogen content of 21% compared with the major nutrient content of the dry sludge of 6.0% maximum.

d) Lime Stabilization.

In the lime stabilization process, lime is added to sludge having a solid content of 20% in sufficient quantity to raise the pH to 12 or higher. The pH creates an environment that is not adequate for the survival of microorganisms. Consequently, the sludge will not putrefy or create odors so long the pH is maintained at this level.

This process is becoming popular in US due to its low inversion cost, but for this process to operate economically, it has to be subsided, because generally, the sludge producer—the municipality—pays the treatment company near $160.00 USD by each ton of dry sludge in order to cover the expenses of the treatment company.

In this process, the treatment company receives the sludge as received from the water treatment plant thickeners, that is, with a solid content of 2.0%, therefore, the treatment company must invoice the treatment plant for the sludge pumping, filtering etc. and at the same time it must generate some profit so that it allows the treatment company to recover the inversion costs during the time it serves to the municipality.

Finally, lime stabilization does not destroy the organics necessary for bacterial growth. Therefore the sludge can not be used and must be treated with an excess of lime or disposed of before the pH drops significantly.

e) Sludge Incineration.

The sludge incineration process, has some advantages when compared with the sludge drying process, due to the fact that during the incineration it is used the combustion heat of the organic matter contained in the sludge, thus decreasing the energy consumption and furthermore, the air volumes to be heated and moved are significantly smaller which constitute an additional energy consumption decrease.

The main disadvantages of the sludge incineration process are related with the drying of the sludge, mainly because of the following problems: the investment, operation and maintenance costs of the incineration step are higher than the costs of the drying step, furthermore, the incineration process is highly pollutant to the environment, because the gaseous effluents produced by the incinerator are very acidic, and contain very toxic metallic compounds such as lead, arsenic, cadmium and mercury (normally present in the urban wastewater), which are considered as very dangerous for the environment and for the health of humans and animals. Additionally, the disposal of the ashes generated by the incinerator and recollected in the ash separator, have the same polluting agents as the gaseous effluents and therefore the use of said ashes for the production of cement for example, is very restrained.

f) Other Processes.

There are other processes for the treatment of sludge and animal dry excrement which add NPK major nutrients and uses the same raw materials as the fertilizer industry, and sometimes, the reaction heat for heating the mass and evaporating the water contained in the sludge, specifically the process of the U.S. Pat. No. 6,159,263, in which the untreated sludge having a solid content of 20% are diluted with 30% of water, and when liquefied, are pumped to a tubular reactor working at 75 p.s.i in which are feed phosphoric acid, sulfuric acid and ammonia, which react and generate sufficient heat to raise the temperature of the mass to 150° C.

The mass exiting the tubular reactor is discharged to a rotary granulator working at atmospheric pressure, by which part of the water is evaporated by flashing when the pressure is reduced.

Subsequently the mass is dried using external energy, requiring the equivalent of 15 million BTU by each ton of dry sludge, therefore, this process consume the 85% of the energy that a common sludge drying process would consume.

U.S. Pat. No. 5,411,586 discloses a process in which hen drop is granulated with the aid of formaldehyde-urea diluted resins and finally drying the produced granules using external energy. This process has a high energy consume and therefore it does not have any advantage compared with the above referred processes.

U.S. Pat. No. 4,038,180 discloses a process in which the filtered sludge having a solid content of 20%, is mixed with acids or mineral anhydrides such as phosphoric or sulfuric, and the acid mix is feed to a fertilizer granulation plant, in which the acids are neutralized with ammonia and based on the neutralization heat, it is evaporated an 85% of the water contained in the sludge.

This process has serious corrosion issues and problems controlling granulation, because there are not included the mechanisms needed for the generation of intermediate acid ammonium sulfate required before the final ammoniating and before its transformation into neutralized ammonium sulfate.

All ammonium sulfate granulation processes known such as TVA in US, INCITEC in Australia, Cominco and ESSO Chemicals in Alberta, Canada, use metallic additives derived from zinc and aluminum, and have the common inconvenient of having high fixed investment costs, due to high recycle volumes and to the specialized materials needed for avoiding corrosion, because the high working temperatures cause the plastics to corrode in presence of the diluted acids and the hot acid ammonium sulfate.

U.S. Pat. No. 4,081,366 discloses a process in which a formaldehyde-urea polymer is added in order to co-polymerize and separate organic matter contained in the sludge by filtration, when an olygomer having a high nitrogen content (21% dry basis) is formed, comprised by 50% of UREAFROM and 50% of sludge organic matter. The filtrated solids have a water content of approximately 80%, and consequently this process is very costly.

As it can be seen, there have been many attempts for achieving the best use of the sludge produced by water treatment plants, mainly due to the great importance of the resource.

Only in U.S. there were produced seven and a half million tons of dry sludge in 1998, product of processing more than 35,000 million wastewater gallons by day and 60% of the 7.5 million tons of dry sludge were recycled to arable lands for improving the quality of the soil. The EPA estimates that in the year 2010 there will be generated 8.2 million tons of dry sludge, 70% of which will be applied to arable lands, considering its high nutrient content.

Applicant developed a process in which the energy consume is reduced a 90% thanks to the addition of a special filtration step in which the water content is reduced a 50% and the remaining water is evaporated by the exothermic reaction occurring in the process.

Additionally, applicant's process include mechanisms that allow some of the by products generated by some of the reactions such as gypsum, to adsorb crystallization water and reduce the humidity of the mass without using external energy.

SUMMARY OF THE INVENTION

It is a main object of the present invention to provide a process for transforming liquid sludge (98% moisture) into a granular high analysis fertilizer (35–40% NPK content) in which the energy consume is reduced a 90%.

It is also a main object of the present invention to provide a process for treating sludge which includes a special filtration step in which the water content in the cake is reduced a 50%, comparatively whit other traditional processes of sludge filtration.

It is another object of the present invention to provide a process for treating sludge in which the water remaining in the cake, after the special filtration step, is evaporated by an exothermic reaction occurring in the process.

It is also another object of the present invention to provide a process for treating sludge which include mechanisms that allow some of the by products generated by some of the reactions such as gypsum, to adsorb crystallization water and reduce the humidity of the mass without using external energy.

These and other objects and advantages of the process for treating sludge of the present invention will become apparent to those persons having an ordinary skill in the art, from the following detailed description of the invention.

DETAILED DESCRIPTION OF THE INVENTION

The process for treating sludge of the present invention comprise the following steps:

a) disinfecting the sludge exiting the thickeners of water treatment plants, normally having a solid content of between about 0.5% to 6.0% by heating the sludge at a temperature of between about 50° C. to 100° C., preferably at 80° C. by means of a heat exchanger installed over the pipes entering to the plant where the sludge will be treated, and adding mineral acids selected form the group consisting of: phosphoric acid, sulfuric acid, nitric acid, hydrochloric acid or a mix thereof, to a static mixer in an amount of between about 1.0% to 500% in dry sludge basis, but preferably 50% of phosphoric acid in dry sludge basis in order to decrease the pH of the mass to 3.0 or less, thus guaranteeing that all pathogen microorganisms are destroyed;

b) neutralizing the acids added in step a) by feeding the disinfected sludge to an agitated tank in which a magnesium and lime slurry (magnesium and calcium hydroxide) at 20% is added, in order to transform the phosphoric acid into apatite hydroxyl which is an insoluble salt and the sulfuric acid into calcium sulfate which is insoluble too. The lime slurry must be added in an amount so that the pH reaches a final value of 8.5, thus assuring that all the phosphor is transformed into apatite hydroxyl which is an excellent filtering aid.

At a pH of 8.5, it is liberated ammonia, so the lime is enriched with magnesium oxide in order to fix the ammonia as highly insoluble double ammonium and magnesium phosphate.

During the addition of the magnesium and calcium slurry there are obtained the following reactions:

$$H_2SO_4 + Ca(OH)_2 \rightarrow CaSO_4 \cdot 2H_2O \quad (1)$$

Sulfuric acid Calcium hydroxide Calcium sulfate

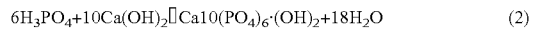

$$6H_3PO_4 + 10Ca(OH)_2 \rightarrow Ca_{10}(PO_4)_6 \cdot (OH)_2 + 18H_2O \quad (2)$$

Phosphoric acid Calcium hydroxide Apatite Hydroxyl Water

$$H_3PO_4 + Mg(OH)_2 + NH_4OH \rightarrow Mg\ NH_4PO_4 + 3H_2O \quad (3)$$

Phosphoric acid Magnesium hydroxide Ammonia Ammonium phosphate Water

The residence time of the sludge inside the agitated tank must be of approximately 15 minutes.

c) filtering the product obtained in step c) in order to reduce its water content and recuperate a cake containing insoluble matter such as: organic matter, apatite hydroxyl, ammonium and magnesium phosphate. The cake contains 40% of water, 32% of organic matter, 2.0% of metallic phosphate, 26% of apatite hydroxyl.

d) eliminating the water contained in the cake obtained in step c) by feeding the cake to a cone reactor system in which are also feed phosphoric acid having a 54% of $P_2O_5$ and sulfuric acid at 98%. The following reactions occur inside the cone reactor system:

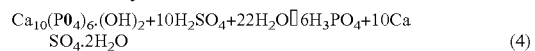

$$Ca_{10}(PO_4)_6 \cdot (OH)_2 + 10H_2SO_4 + 22H_2O \rightarrow 6H_3PO_4 + 10CaSO_4 \cdot 2H_2O \quad (4)$$

Apatite hydroxyl Sulfuric acid Water Phosphoric acid Calcium sulfate

The reaction between the apatite hydroxyl and sulfuric acid is highly exothermic and generates 255 Kcal/mol of apatite hydroxyl, from which, 85% is used for raising the temperature of the reacting mass until the water boiling point and the remaining 15% is used to evaporate part of the water contained in the reacting mass, that is, for each ton of reacted apatite hydroxyl there are evaporated only 57 kg of water.

The phosphoric acid acts as diluting agent to avoid the solidification of the obtained mass or a viscosity increase.

e) feeding the product obtained in step d) to a granulator-ammoniator in which are feed ammonia in order to neutralize the phosphoric acid and recycled matter from this process in order to maintain a 3:1 recycled/feed solid relation and guarantee an adequate granulation. The ammonia is feed until obtaining an ammonia/phosphoric molar relation of 1.667. The following reaction occurs inside the granulator-ammoniator:

$$5NH_3 + 3H_3PO_4 \rightarrow 2(NH_4)_2SO_4 + NH_4H_2PO_4 \quad (5)$$

Ammonia Phosphoric acid Bi-ammonic phosphate Mono-ammonic phosphate

When the neutralization ends, there are obtained two moles of bi-ammonic phosphate by each mol of mono-ammonic phosphate.

Since the reaction #5 is exothermic, there are liberated 46 Kcal by each mol of phosphoric acid that reacts with ammonia, that is, by each ton of phosphoric acid, there are evaporated 0.890 water tons, which is sufficient to dry the mass inside the ammoniator-granulator.

It was found that when the humidity is low and the molar relation ammonia/phosphoric high at the exit of the ammoniator-granulator, the ammoniating reaction is less efficient, therefore, the phosphoric acid is feed as a diluting agent for adding humidity and as a phosphor source, thus maintaining and adequate efficiency for providing the necessary heat for evaporating at least 90% of the water contained in the mass inside the granulator-ammoniator.

A blower suctions fresh air trough the ammoniator-granulator, which allows evaporating water under 85° C. thus assuring that the organic matter does not ignite. The air suctioned from the apparatus contains dust and ammonia gas that is recuperated in a washing system operating with phosphoric acid additions in order to fix the ammonia and recycling it as ammonium phosphate to the process.

The water content of the product coming out form the granulator-ammoniator is maintained at approximately 2.5% by ammonia additions, so that the pH of the solids inside the granulator-ammoniator is maintained between 6.0 and 6.5.

f) The granulated product obtained in step e) is feed to a dryer including a vibrating sieve, which classifies the dry product by size as "normal size", "above normal size" and "below normal size" which are predetermined by client. The normal size product is stored, the product having an above normal size is grinded and mixed with product having a size below normal and is recycled to the ammoniator-granulator of step e).

It is important to emphasize that the acids added in the disinfecting step don't pollute the water but serve as a disinfecting agent instead, since there are transformed to insoluble compounds which are retained in the filtering step and become part of the final product.

The apatite hydroxyl is an excellent filtering aid, by which the filtering step is optimized thus obtaining a water content in the cake of approximately 45% compared with the water content of approximately 80% that would be obtained without using any filtering aid. Furthermore, it is possible to use smaller filters because the gelatinous consistence and incompressible property of the cake is eliminated.

The disinfecting step provide the advantage that during the subsequent steps of the process, a biologically inert material is manipulated, which is not harmful to the operators health, and additionally the filtering aids reduce the quantity of water to be eliminated in order to obtain a completely dry product.

One of the main advantages of the process of the present invention comprise the fact that in order to evaporate the water contained in the cake and economically recuperate the nutrients contained thereof, the use of external energy is not required—compared with the prior art granulation processes— since part of the energy is generated by the exothermic chemical reactions occurring in the process, and additionally, the reactions occurring in the process of the present invention generate calcium sulfate which has the property of adsorbing water and fixing crystallization water when cooling, thus reducing the humidity of the mass and improving the agronomic and physic properties of the final product.

Thanks to the enrichment of lime with magnesium, a serious polluting problem is solved, since the produced ammonia is fixed as a double ammonium and magnesium phosphate which is the only insoluble ammonia salt mentioned in the specialized literature.

EXAMPLE 1) 100 kg of sludge having a solid content of 2.0 are heated at 80° C. inside a heater and transferred to a static mixer.

2) There is added phosphoric acid having 54% of $P_2O_5$ inside the mixer so that for each 100 kg of sludge having a solid content of 2.0%, there are added: 1,500 kg of phosphoric acid having a 54% of $P_2O_5$ in order to lower the pH of the mass below 3.0 by which is achieved the sterilization of the mass at operation temperature.

3) The disinfected sludge is then transferred to an agitated tank inside of which 4,300 kg of a lime and magnesium slurry having a calcium content of 20% are added. The residence time of the mass inside the agitated tank is of 15 minutes in order to allow the reactions between phosphoric acid and calcium hydroxide and between ammonia and magnesium phosphate to complete and produce apatite hydroxyl and ammonium and magnesium phosphate thus fixing the pH at 8.5.

4) The mass is feed to a filter in order to separate the solid from the water. The water free of pathogen microorganisms and organic matter is returned to the waste water treatment plant.

5) The humid solids recuperated from the filter are transferred to a cone reactor system, which receive the humid solids containing approximately 6.140 base kg, 1.532 kg of sulfuric acid at 98% and 2.938 kg of phosphoric acid having a 54% of $P_2O_5$ as diluting agent.

6) The mass exiting the cone reactor system is feed to a granulator inside of which are added: 0.867 kg of anhydride ammonia by which are obtained 9.254 kg of a final product in dry basis containing 35.0% of nutrients expressed as Nitrogen, $P_2O_5$ and $k_2O$. The humidity of the product exiting the granulator is maintained at approximately 2.5% by ammonia additions, so that the pH of the solids inside the granulator-ammoniator is maintained between 6.0 and 6.5.

7) The granulated product is feed to a dryer including a vibrating sieve, which classifies the dry product by size. The normal size product is stored, the product having an above normal size is grinded and mixed with product having a below normal size and recycled to the granulator.

9) The gases exiting the granulator and the dryer are suctioned by a blower and transferred to a washer in which dust and the ammonia that did not react inside the granulator are recovered by phosphoric acid additions. The solution obtained is recycled to the cone reactor system.

What is claimed is:

1. A process for treating sludge comprising the steps of:
    a) disinfecting the sludge by heating it at a temperature of between about 50° C. to about 100° C. and adding phosphoric acid, and one or more mineral acids selected from the group consisting of sulfuric acid, nitric acid, hydrochloric acid, and mixtures thereof;
    b) neutralizing the acids added in step a) by adding a magnesium and calcium slurry to react the phosphoric acid with calcium hydroxide and magnesium hydroxide to obtain insoluble calcium and magnesium phosphate to reach a final pH value of 8.5 and to liberate ammonia which reacts with the magnesium phosphate to produce apatite hydroxyl;
    c) filtering the product obtained in step b) with the apatite hydroxyl to reduce its water content and recuperate a cake containing insoluble matter;
    d) eliminating the water contained in the cake obtained in step c) by feeding the cake to a cone reactor system to which are fed phosphoric acid and sulfuric acid to obtain an exothermic reaction between the apatite hydroxyl and the sulfuric acid to evaporate the water present in the cake and transform the insoluble calcium phosphate into assimilable soluble calcium sulfate;
    e) feeding the product obtained in step d) to a granulator-ammoniator to which are fed ammonia to neutralize the phosphoric acid and maintain granulation thus causing an exothermic reaction between the ammonia and the apatite hydroxyl which further dries the product, and a granulated product is obtained containing 35% to 40% or greater by weight of nutrients expressed as nitrogen, $P_2O_5$ and $K_2O$, while achieving a 90% saving in energy; and,
    f) drying and sieving the granulated product obtained in step e) in order to classify particles by size.

2. The process as claimed in claim 1, wherein in step a) the mineral acids are added to a static mixer in an amount of between about 1.0% to 500%, by weight, based on a dry sludge basis.

3. The process as claimed in claim 1, wherein in step a) the mineral acids are added to a static mixer in an amount of between about 1.0% to 500% by weight on a dry sludge basis, to reduce the pH of the sludge to 3.0 or lower, whereby all pathogenic microorganisms are destroyed.

4. The process as claimed in claim 1, wherein in step a) the mineral acid comprises sulfuric acid.

5. The process as claimed in claim 1, wherein step b) is carried out by adding a magnesium and calcium slurry at a concentration of 20%.

6. The process as claimed in claim 1, wherein step b) is carried out inside an agitated tank for 15 minutes.

7. The process as claimed in claim 1, wherein in step c) the insoluble matter in the cake includes organic matter, apatite hydroxyl, ammonium and magnesium phosphate.

8. The process as claimed in claim 1, wherein in step c) the cake contains 40%, by weight, of water; 32%, by weight, of organic matter; 2.0%, by weight, of metallic phosphate; and 26%, by weight, of apatite hydroxyl.

9. The process as claimed in claim 1, wherein step d) is carried out by feeding the cake to a cone reactor system to which are also fed phosphoric acid having a 54% concentration of $P_2O_5$ and sulfuric acid at 98% concentration.

10. The process as claimed in claim 1, wherein in step c) the cake contains apatite hydroxyl, and wherein in step d) the reaction between the apatite hydroxyl and sulfuric acid is highly exothermic and generates 255 Kcal/mol of apatite hydroxyl, of which, 85% are used to raise the temperature of the cake to the boiling point of water and the remaining 15% are used to evaporate part of the water contained in the cake.

11. The process as claimed in claim 1, wherein in step c) the cake contains apatite hydroxyl, and wherein in step d) the reaction between the apatite hydroxyl and sulfuric acid produces calcium sulfate and phosphoric acid which act as a diluting agent to avoid solidification of the cake and an increase in viscosity.

12. The process as claimed in claim 1, wherein step e) is carried out by feeding the cake to a granulator-ammoniator to which are also fed ammonia, to neutralize the mineral acid, and recycled matter to maintain a 3:1 water/solids ratio and provide adequate granulation.

13. The process as claimed in claim 1, wherein the mineral acid comprises phosphoric acid and wherein step e) is carried out by feeding the cake to a granulator-ammoniator to which is fed ammonia, until an ammonia/phosphoric molar relation of 1.667 is obtained, and recycled matter to maintain a 3:1 water/solids ratio and provide adequate granulation.

14. The process as claimed in claim 1, wherein step e) is carried out by feeding the cake to a granulator-ammoniator which includes a blower which suctions fresh air through the ammoniator-granulator which allows water to evaporate at a temperature below 85° C. whereby ignition of the organic matter is avoided.

15. The process as claimed in claim 1, wherein step e) is carried out by feeding the cake to a granulator-ammoniator including a blower which suctions fresh air through the ammoniator-granulator, said air containing dust and ammonia gas which is recuperated in a washing system operating with phosphoric acid additions in order to fix the ammonia and recycle it as ammonium phosphate.

16. The process as claimed in claim 1, wherein in step e) the water content of the product issuing from the granulator ammoniator is maintained at approximately 2.5%, by weight, by additions of ammonia whereby the pH of the solids inside the granulator-ammoniator is maintained between 6.0 and 6.5.

* * * * *